United States Patent
Adelman

(10) Patent No.: US 10,130,086 B2
(45) Date of Patent: Nov. 20, 2018

(54) FIXED BAR DREDGE WITH IMPROVED CORE ASSEMBLY

(71) Applicant: Richard J. Adelman, Newtown, PA (US)

(72) Inventor: Richard J. Adelman, Newtown, PA (US)

( * ) Notice: Subject to any disclaimer, the term of this patent is extended or adjusted under 35 U.S.C. 154(b) by 73 days.

(21) Appl. No.: 14/999,677

(22) Filed: Jun. 10, 2016

(65) Prior Publication Data

US 2016/0360739 A1 Dec. 15, 2016

Related U.S. Application Data

(60) Provisional application No. 62/230,597, filed on Jun. 10, 2015.

(51) Int. Cl.
*A01K 91/053* (2006.01)
*A01K 91/08* (2006.01)
*A01K 85/14* (2006.01)

(52) U.S. Cl.
CPC .............. *A01K 91/08* (2013.01); *A01K 85/14* (2013.01); *A01K 91/053* (2013.01)

(58) Field of Classification Search
CPC .............................. A01K 91/053; A01K 91/08
USPC ........................................................ 43/42.74
See application file for complete search history.

(56) References Cited

U.S. PATENT DOCUMENTS

| 1,352,979 | A | * | 9/1920 | Lawrence | A01K 91/053 43/42.74 |
| 1,645,644 | A | * | 10/1927 | Davenport | A01K 85/16 43/42.4 |
| 2,122,836 | A | * | 7/1938 | Gegerfeldt | A01K 91/02 43/15 |

(Continued)

FOREIGN PATENT DOCUMENTS

| GB | 191123577 A | * | 8/1912 | ........... A01K 91/053 |
| GB | 2088681 A | * | 6/1982 | ........... A01K 91/053 |

(Continued)

*Primary Examiner* — Darren W Ark
(74) *Attorney, Agent, or Firm* — Armand M. Vozzo, Jr.

(57) ABSTRACT

A fixed bar luring dredge comprising a high-strength core member tubular in form and assembled to hold a plurality of spreader bars extending through and attached to the core member in a fixed radial pattern with each spreader bar being disposed in a separate and distinct plane to enhance the strength and support of the spreader bar members in trolling. Each spreader bar is sized to pass transversely through a pair of opposed openings in the wall of the tubular core member and is secured therein with a respective crimp sleeve at each opening. Separate swivel fittings with rotatable sections formed to fit longitudinally within of the core member are positioned partially inside the chamber of the core member at opposite ends thereof, each of the swivel fittings having a respective transverse opening formed therein that serves to engage one of the spreader bars passing through the core member and thereby hold the respective swivel fitting in place. The spreader bars are each provided with a plurality of dropper fasteners fitted along the outer (Continued)

length of each bar for suspending a respective number of luring strips bearing selected baitfish images designed to attract game fish while trolling.

14 Claims, 3 Drawing Sheets

(56) References Cited

U.S. PATENT DOCUMENTS

| | | | | |
|---|---|---|---|---|
| 2,196,472 A * | 4/1940 | Moriarty | | A01K 91/053 43/21.2 |
| 2,201,351 A * | 5/1940 | Skoverski | | A01K 91/053 43/42.74 |
| 2,289,663 A * | 7/1942 | Linhares | | A01K 93/00 43/42.74 |
| 2,492,638 A * | 12/1949 | Hickson | | A01K 91/053 43/42.74 |
| 2,592,741 A * | 4/1952 | Ristine | | A01K 91/053 43/42.74 |
| 2,877,593 A * | 3/1959 | Baldridge | | A01K 91/053 43/42.74 |
| 3,105,318 A * | 10/1963 | Birrell | | A01K 93/00 43/42.74 |
| 3,143,824 A * | 8/1964 | Thomas | | A01K 85/00 43/42.11 |
| 3,646,700 A * | 3/1972 | Pond | | A01K 91/053 43/42.74 |
| 3,991,505 A * | 11/1976 | Simeti | | A01K 91/053 43/42.74 |
| 4,571,877 A * | 2/1986 | Montgomery | | A01K 85/00 43/42.11 |
| 4,901,470 A * | 2/1990 | Gentry | | A01K 85/00 43/42.13 |
| 5,301,454 A * | 4/1994 | Chen | | A01K 91/03 24/580.1 |
| 5,400,542 A * | 3/1995 | Johnson | | A01K 85/00 43/42.06 |
| 5,605,004 A * | 2/1997 | Boullt | | A01K 85/00 43/42.13 |
| 5,974,723 A * | 11/1999 | Taibi | | A01K 85/02 43/42.11 |
| 7,010,881 B2 * | 3/2006 | Altman | | A01K 85/00 43/42.13 |
| 7,412,795 B2 * | 8/2008 | Glynn | | A01K 91/04 43/42.74 |
| 8,572,887 B2 * | 11/2013 | Adelman | | A01K 91/053 43/42.06 |
| 9,578,862 B2 * | 2/2017 | Taboada | | A01K 91/053 |
| 9,591,840 B2 * | 3/2017 | LeHew | | A01K 91/053 |
| 2003/0208948 A1 * | 11/2003 | Higgins | | A01K 91/053 43/42.74 |
| 2005/0050790 A1 * | 3/2005 | Higgins | | A01K 91/053 43/42.74 |
| 2008/0040966 A1 * | 2/2008 | Stone | | A01K 91/053 43/42.74 |

FOREIGN PATENT DOCUMENTS

| | | | |
|---|---|---|---|
| JP | 05292856 A | * | 11/1993 |
| JP | 10178987 A | * | 7/1998 |
| JP | 2008220182 A | * | 9/2008 |
| JP | 4963072 B2 | * | 6/2012 |

* cited by examiner

FIXED BAR DREDGE WITH IMPROVED CORE ASSEMBLY

CROSS-REFERENCE TO RELATED APPLICATION

This application claims the benefit of U.S. Provisional Application Ser. No. 62/230,597 filed Jun. 10, 2015 for a Fixed Bar Dredge with Improved Core Assembly.

BACKGROUND OF THE INVENTION

The present invention relates generally to trolling lures that are used in connection with fishing vessels to attract fish to the surface of the water to facilitate a catch, and more particularly to an improved fixed bar dredge having a high-strength tubular core adapted to hold a plurality of spreader bar members extending therethrough in a radial pattern with each spreader bar member disposed in a separate and distinct plane to enhance the strength and support of the spreader bar members in trolling.

Sport fishing in freshwater and saltwater is extremely popular around the world and provides enjoyment and competition to millions of enthusiasts. Essential to sport fishing, artificial lures intended to simulate live bait in their appearance and movement have long been used and are found in a variety of styles, designs and arrangements suitable for casting and trolling. Trolling lures used commonly in offshore fishing are towed on extended lines from a moving boat to draw game fish to a trailing hook using the look and action of the lures in the water as well as the water disturbance they make to attract the game fish and bring them close to the water surface for the catch. A wide variety of these trolling lures can be found rigged both in-line on so-called "daisy chains" and in umbrella-like "spreader" rigs designed to simulate a school of moving baitfish when trolled using an array of artificial lures in the form of strips called teasers bearing fish images that are particularly effective in attracting fresh water stripers and big game fish of all sorts.

Luring dredges are weighted trolling devices that have become increasingly popular in offshore fishing to create the illusion of a tightly packed school of baitfish swimming just beneath the surface of the water. These luring dredges generally comprise a plurality of rigid spreader arms of stainless steel or titanium that extend out in multiple directions from a centralized hub with a series of coupling members called "droppers" along each spreader arm that can accept and engage any number of teaser strips for deployment upon the dredge. One of the most popular types of these luring dredges is a fixed bar dredge having an umbrella-like structure with the spreader arms fixed at one end to the centralized hub and made to extend therefrom in a radial pattern. This type of fixed bar dredge is a relative staple in the gear box of sport fishermen because it is relatively inexpensive yet effective in its trolling deployment. Unfortunately, the structural integrity of these fixed bar dredges have been subject to failure with the spreader bars breaking down and either fracturing at their point of attachment to the centralized hub or just separating therefrom under the pressure of high-speed trolling. While some developments have been made in strengthening the attachments of the spreader bars in these fixed bar dredge structures to reduce their detachment while trolling, there is still a need for further improvements in the design, manufacture and assembly of the fixed bar dredge to ensure its structural integrity and avoid failures of the spreader bars and their attachments while deployed in trolling at increasingly higher speeds.

SUMMARY OF THE INVENTION

Accordingly, it is a general purpose and object of the present invention to provide an improved luring dredge of the type deployed for trolling use in sport fishing.

A more particular object of the present invention is to provide an improved fixed bait luring dredge for trolling use that is constructed and assembled having increased structural integrity greater than those prior art luring dredges of the same type heretofore available.

Another object of the present invention is to provide an improved fixed bar luring dredge construction that is capable of maintaining its structural integrity despite deployment at high trolling speeds and under the load of large game fish.

Still another object of the present invention is to provide an improved fixed bar luring dredge that is rugged and durable in construction and reliable in its performance.

A still further object of the present invention is to provide an improved fixed bar luring dredge that is that is relatively inexpensive to manufacture and assemble and easy to deploy.

Briefly, these and other objects of the present invention are accomplished by an improved fixed bar luring dredge comprising a high-strength core member tubular in form and assembled to hold a plurality of spreader bars extending through and attached to the core member in a fixed radial pattern with each spreader bar disposed in a separate and distinct plane to enhance the strength and support of the spreader bars in trolling. Each spreader bar is sized to pass transversely through a pair of opposed openings in the wall of the tubular core member and is secured therein with a respective crimp sleeve at each opening. Separate swivel fittings with rotatable sections formed to fit longitudinally within of the core member are positioned partially inside the chamber of the core member at opposite ends thereof, each of the swivel fittings having a respective transverse opening formed therein that serves to engage one of the spreader bars passing through the core member and thereby hold the respective swivel fitting in place. The spreader bars are each provided with a plurality of dropper fasteners fitted along the outer length of each bar for suspending a respective number of luring strips bearing selected baitfish images designed to attract game fish while trolling.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DETAILED DESCRIPTION OF THE INVENTION

Figure 1:
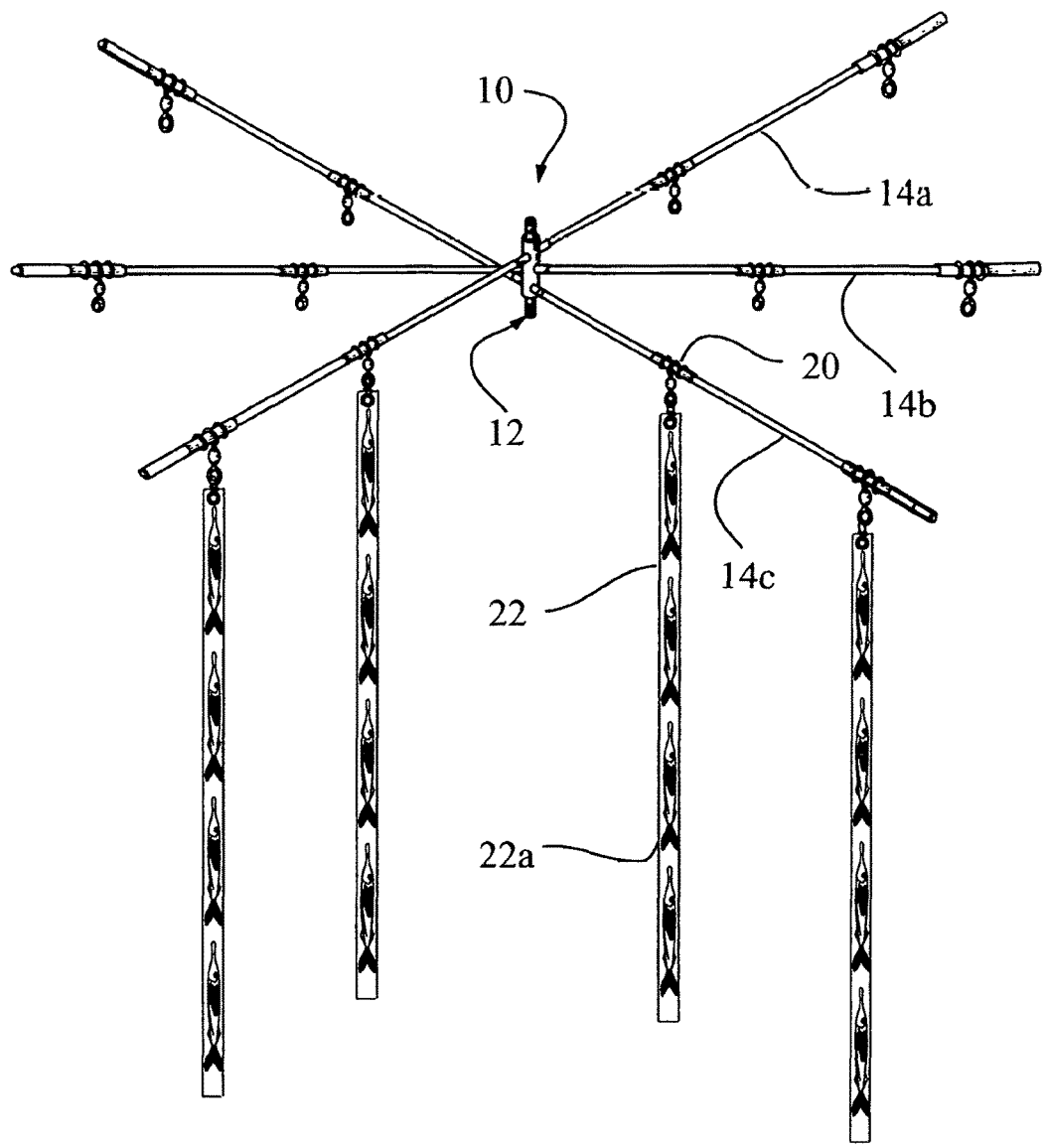
FIG. 1 is a perspective view from above of the fixed bar luring dredge made in accordance with the present invention and shown operatively deployed for trolling use.

The following is a detailed description of a preferred embodiment of the present invention and the best presently contemplated mode of its production and practice. This description is further made for the purpose of illustrating the general principles of the invention but should not be taken in a limiting sense, the scope of the invention being best determined by reference to appended claims.

Referring to the drawings, the following is a list of structural components of the present fixed bar luring dredge, generally designated 10, and those associated structural elements shown employed in connection with the present invention:

10 fixed bar luring dredge;
12 core assembly;
14a first spreader bar;
14b second spreader bar;
14c third spreader bar;
15a/b crimp sleeves;
16 core member;
17 transverse holes;
18 top swivel fitting;
18a/b holes in top swivel fitting;
19 bottom swivel fitting;
19a/b holes in bottom swivel fitting;
20 dropper fittings;
22 luring strips; and
22a baitfish images.

Figure 2:
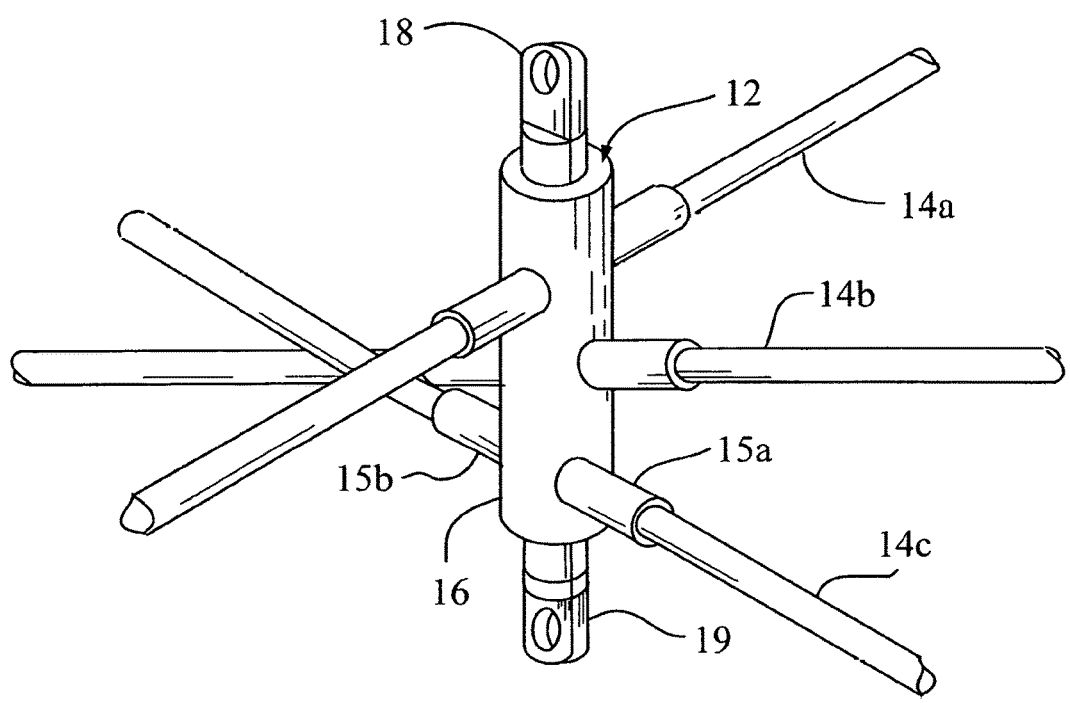
FIG. 2 is an enlarged perspective view of the core assembly of the deployed fixed bar luring dredge shown in FIG. 1.

Referring now to FIGS. 1 and 2, the fixed bar luring dredge 10 of the present invention comprises a core assembly 12 that includes a tubular core member 16 and separate swivel fittings 18 and 19 similarly constructed having rotatable segments fitted to engage the open ends of the core member at the top and bottom thereof. In the present fixed bar luring dredge 10, the core assembly 12 is adapted to receive and hold in attachment a plurality of spreader bars 14a, 14b and 14c in a radial pattern that is established with each spreader bar member being disposed in a separate and distinct plane. In accordance with the present invention, the radial pattern of the spreader bars 14a, 14b and 14c is collectively rotatable as a group about the core assembly 12 by means of the assembled interaction of the swivel fittings 18 and 19 within the core member 16, as described below in greater detail.

The spreader bars 14a, 14b and 14c are rigid cylindrical rods, typically ⅛" or 5/32" in diameter, cut in equal lengths and preferably made from a stainless steel or titanium material. At selected intervals along the length of each spreader bar 14a, 14b and 14c outward from its respective attachment to the core assembly 12 are attached a series of dropper fittings 20 for suspending a respective number of luring strips 22 commonly used in game fishing, each luring strip bearing a series of baitfish images 22a intended to replicate in appearance a school of fish in the water that serves to attract game fish while trolling. It should be understood that in the deployed configuration depicted in FIG. 1, the present fixed bar luring dredge 10 is ready for trolling use with an appropriate tow line (not shown) being secured to the core assembly 12, particularly connected to the top swivel fitting 18 and the opening 18a formed therein, to permit full rotation of the luring dredge in the water with the luring strips 22 suspended from the radially separated spreader bars 14a, 14b and 14c.

Figure 3:
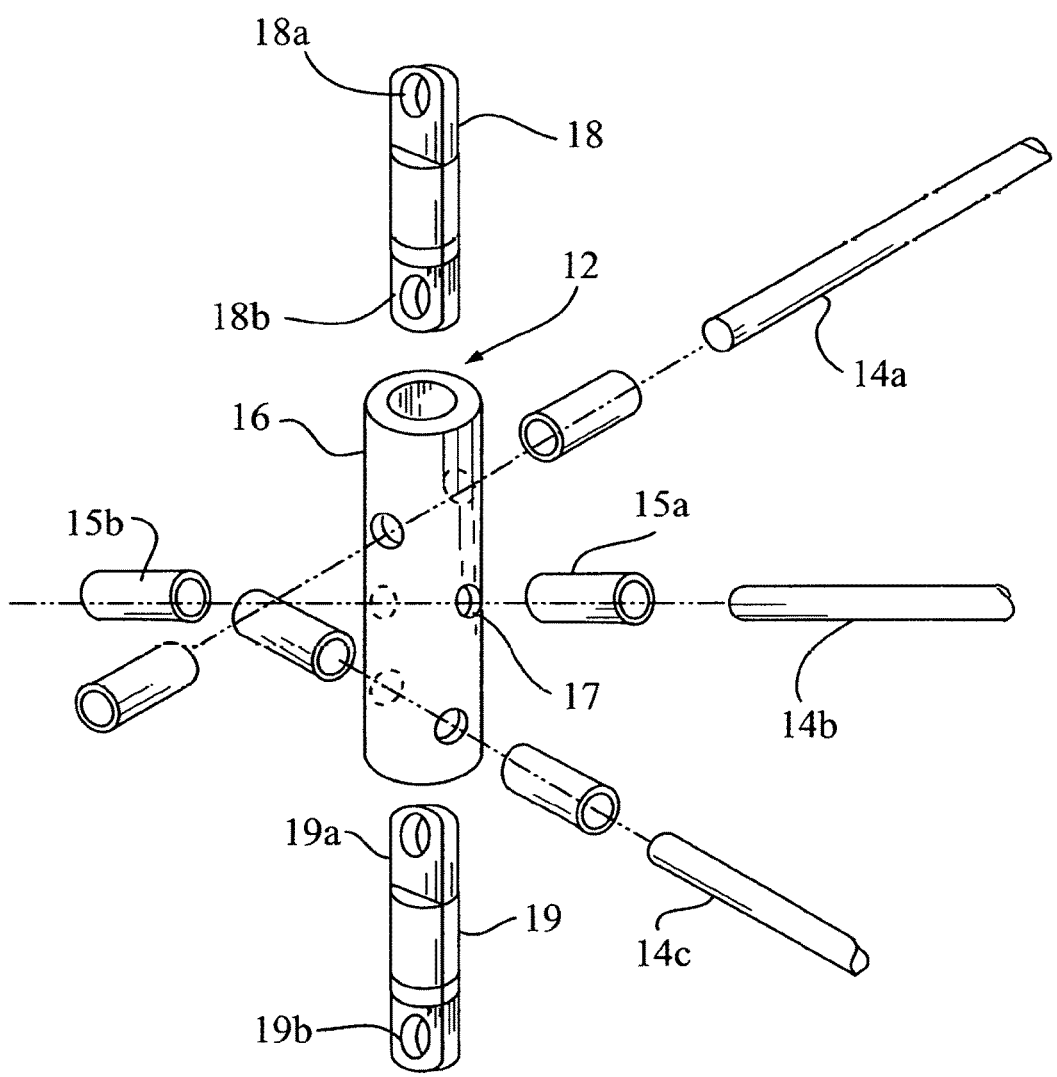
FIG. 3 is an exploded perspective view of the core assembly shown in FIG. 2 of the present fixed bar luring dredge.

Referring now more particularly to FIGS. 2 and 3, the core member 16 is tubular in form and made from a strong and corrosion-resistant metallic material, such as stainless steel. The tubular form of the core member 16 is preferably one that is cylindrical, as shown in the drawing figures, or may be a tubular form having a multi-faced and symmetrical wall structure, such as one having a hexagonal wall that can provide opposite faces for passing the spreader bars 14a, 14b and 14c transversely through the core member in the desired radial pattern. A series of transverse holes 17 sized in diameter to fit the spreader bars 14a, 14b and 14c are made through the wall of the core member 16 in pairs that are aligned at a substantially horizontal or even level on opposite sides of the core member. These pairs of aligned transverse holes 17 are repeatedly formed for the specific number of spreader bars 14a, 14b and 14c intended to be assembled and held on the core assembly 12, with each aligned pair of transverse holes being spaced apart vertically or in elevation on the core member 16 and made in different angular directions to accommodate and provide the desired radial pattern of the spreader bars.

The top and bottom swivel fittings 18 and 19, respectively, are substantially cylindrical members, preferably made of a corrosion-resistant metallic material, such as stainless steel. The swivel fittings 18 and 19, of the type commercially available and commonly known as bullet swivels, are a rotatable joined assembly of two separate but substantially similar segments, each segment having a bullet-like cylindrical portion and an extending pad-like portion with a hole formed therethrough. In their joined assembly, the respective bullet-like portions are made to abut and rotatably coupled together near the middle of the swivel fittings 18 and 19 so that the joined segments may revolve and turn relative to each other on the same longitudinal axis with the respective holes, 18a, 18b and 19a, 19b, being disposed on the outer side of each swivel fitting.

Sized in their diameters to fit longitudinally into the chamber of the core member 16, the respective top and bottom swivel fittings 18 and 19 are partially inserted within the opposite ends of the core member of the core assembly 12 with one of the respective holes 18b and 19a of each swivel fitting being positioned within the chamber and the other holes 18a and 19b positioned outside. This intended disposition of the swivel fittings 18 and 19 partially within chamber of the core member 16 will result in an intermediate space between the proximal ends of the swivel fittings in the middle of the core member. Further in this disposition, the respective interior holes 18b and 19a may be turned to align with corresponding pairs of transverse holes 17 near the top and bottom of the core member 16 and thereby permit engagement of the interior holes with the upper and lower ones of the spreader bars 14a, 14c passed through the core member. It should be understood that the middle one of the spreader bars 14b will pass directly through the transverse holes 17 near the middle of the core member 16 without engaging any part of either the top or bottom swivel fitting 18, 19. Pairs of crimp sleeves 15a and 15b, each made of a deformable metal material and normally configured in a cylindrical form, are normally sized in diameter to insert upon and fit over the spreader bars 14a, 14b and 14c. Used in pairs to firmly secure each of the spreader bars 14a, 14b and 14c in proper position upon the core assembly 12, the crimp sleeves 15a and 15b are positioned along the surface of the respective spreader bars and made to be compressed thereon immediately abutting the wall of core member 16 on either side thereof where the respective spreader bar enters and exits the transverse holes 17. This compression of the crimp sleeves 15a and 15b in pairs immediately on either side of the core member 16 serves to fix the position of the spreader bars 14a, 14b and 14c in their intended radial pattern and attach them firmly to the core assembly 12 for strength and support of the spreader bars in trolling.

Therefore, it is apparent that the described invention provides an improved fixed bar luring dredge of the type deployed for trolling use in sport fishing. More particularly, the present invention provides an improved fixed bar luring dredge for trolling use that is constructed and assembled having increased structural integrity greater than those prior art luring dredges of the same type heretofore available. In its described construction and assembly, the present fixed luring dredge is rugged and durable and capable of maintaining its structural integrity despite deployment at high trolling speeds and under the load of large game fish. In addition, the disclosed fixed bar luring dredge is relatively inexpensive to manufacture and assemble, easy to deploy, and reliable in its performance.

Obviously, other embodiments and modifications of the present invention will readily come to those or ordinary skill in the art having the benefit of the teachings presented in the foregoing description and drawings. Alternate embodiments of different shapes and sizes, as well as substitution of known materials or those materials that may be developed at a future time to perform the same function as the present described embodiment are therefore considered to be part of the present invention. Accordingly, it is understood that this invention is not limited to the particular embodiment described, but rather is intended to cover modifications within the spirit and scope of the present invention as expressed in the appended claims.

What is claimed is:

1. A luring dredge for use in trolling fish, comprising:
   a core member of a fixed length having a tubular wall surface with openings at opposite ends thereof, the wall surface of said core member being provided with a plurality of transverse holes formed through the wall surface in separate pairs spaced apart along the fixed length thereof, each of the separate pairs of transverse holes being aligned in a different angular direction with respect to other of said separate pairs of transverse holes;
   a plurality of bar members each having a continuous length transversely extending through said core member and secured in place within a respective pair of the separate pairs of aligned transverse holes so that said bar members are disposed in a fixed radial pattern upon said core member with each of said bar members disposed in a separate and distinct plane with respect to other of said bar members;
   a pair of swivel fittings each constructed having separately rotatable segments joined together, one of the rotatable segments of each of the swivel fittings inserted within a respective one of the openings at opposite ends of said core member, the inserted one of the rotatable segments of each of the swivel fittings operatively engaging a selected one of said bar members within said core member to secure each of said swivel fittings in place therein and thereby permit collective rotation of said plurality of bar members in the fixed radial pattern upon said core member; and
   a plurality of crimp sleeves sized to fit over the continuous length of said bar members and made compressible thereon to secure said plurality of bar members in attachment to said core member at the wall surface thereof.

2. A luring dredge according to claim 1, further comprising:
   a plurality of luring strips fastened to said plurality of bar members at selected intervals along the continuous length thereof, each of said luring strips bearing a series of baitfish images intended to attract fish while trolling.

3. A luring dredge according to claim 1, wherein said core member is cylindrical in form.

4. A luring dredge according to claim 3, wherein said core member is made from a high-strength, corrosion-resistant material.

5. A luring dredge according to claim 1, wherein each of the separately rotatable segments of said swivel fittings is assembled having a bullet-like cylindrical portion and an extending pad-like portion with a hole formed therein, the respective bullet-like portions on each of the swivel fittings being joined together along a common longitudinal axis so that the joined segments may revolve and turn relative to each other on the common longitudinal axis with the respective holes being disposed at opposite ends of each of said swivel fittings.

6. A luring dredge for trolling fish with a tow line, comprising:
   a tubular core member of a fixed length having a chamber and surrounding wall with openings at opposite ends thereof, the wall of said core member having a plurality of transverse holes formed therethrough in a series of hole pairs, each pair of the hole pairs being aligned in a different angular direction with respect to other of the series of hole pairs through said core member and spaced apart along the fixed length thereof;
   a plurality of bar members each having a continuous length passing transversely through the chamber of said core member and secured in place within a respective pair of the series of hole pairs so that said bar members are disposed in a fixed radial pattern upon said core member with each of said bar members disposed in a separate and distinct plane with respect to other of said bar members;
   a pair of swivel fittings each having separately rotatable segments joined axially together, with one of the rotatable segments of each of the swivel fittings set within the chamber of said core member and an other of said rotatable segments of each of the swivel fittings extending therefrom, the one of the rotatable segments of each of the swivel fittings set within the chamber being adapted to engage a selected one of said bar members within said core member and the other of said rotatable segments of each of the swivel fittings extending therefrom being operatively engageable to the tow line thereby permitting collective rotation of said plurality of bar members in the fixed radial pattern upon said core member while trolling; and
   a plurality of connector sleeves sized to fit over the continuous length of said bar members and made compressible thereon to secure said bar members in attachment to said core member immediately abutting the wall thereof on opposing sides of the wall.

7. A luring dredge according to claim 6, wherein each of the separately rotatable segments of said swivel fittings is assembled having a bullet-like cylindrical portion and an extending pad-like portion with a hole formed therein, the respective bullet-like portions on each swivel fitting being joined axially together along a common longitudinal axis so that the joined segments may revolve and turn relative to each other on the common longitudinal axis with the respective holes being disposed at opposite ends of each of said swivel fittings.

8. A luring dredge according to claim 7, further comprising;
- a plurality of luring strips fastened to said plurality of bar members at selected intervals along the continuous length thereof, each of said luring strips bearing a series of baitfish images intended to attract fish while trolling.

9. A luring dredge according to claim 7, wherein said tubular core member is cylindrical in form.

10. A luring dredge according to claim 9, wherein said tubular core member is made from a high-strength, corrosion-resistant material.

11. An improved luring dredge of a type having a plurality of spreader bars fixed to a centralized hub and made to extend therefrom in an umbrella-like radial structure for trolling fish on a tow line, wherein the improvement comprises a core assembly comprising:
- a tubular core member of a fixed length having a chamber and surrounding wall with openings at opposite ends thereof, the wall of said core member having a plurality of transverse holes formed therethrough in a series of hole pairs, each hole pair of the series of hole pairs being aligned in a different angular direction with respect to other of the series of hole pairs through said core member and spaced apart along the fixed length thereof;
- a plurality of bar members each having a continuous length passing transversely through the chamber of said core member and secured in place within a respective pair of the series of hole pairs so that said bar members are disposed in a fixed radial pattern upon said core member with each of said bar members disposed in a separate and distinct plane with respect to other of said bar members;
- a plurality of connector sleeves sized to fit over the continuous length of said bar members and made compressible thereon to secure said bar members in attachment to said core member immediately abutting the wall thereof on opposing sides of the wall; and
- a pair of swivel fittings each having separately rotatable segments joined axially together, with one of the rotatable segments of each of the swivel fittings set within the chamber of said core member and an other of said rotatable segments of each of the swivel fittings extending therefrom, the one of the rotatable segments of each of the swivel fittings set within the chamber being adapted to engage a selected one of said bar members within said core member and the other of said rotatable segments of each of the swivel fittings extending therefrom being operatively engageable to the tow line thereby permitting collective rotation of said plurality of bar members in the fixed radial pattern upon said core member while trolling.

12. The improved luring dredge according to claim 11, wherein each of the separately rotatable segments of said swivel fittings is assembled having a bullet-like cylindrical portion and an extending pad-like portion with a hole formed therein, the respective bullet-like portions on each swivel fitting being joined axially together along a common longitudinal axis so that the joined segments may revolve and turn relative to each other on the common longitudinal axis with the respective holes being disposed at opposite ends of each of said swivel fittings.

13. The improved luring dredge according to claim 12, wherein said core member is cylindrical in form.

14. The improved luring dredge according to claim 13, wherein said core member is made from a high-strength, corrosion-resistant material.

* * * * *